No. 608,590. Patented Aug. 9, 1898.
G. A. FREUND.
FLOWER POT AND HANGING BASKET.
(Application filed Dec. 24, 1897.)
(No Model.) 2 Sheets—Sheet 1.

Inventor
Gustave A. Freund,
Witnesses
By his Attorneys,

No. 608,590. Patented Aug. 9, 1898.
G. A. FREUND.
FLOWER POT AND HANGING BASKET.
(Application filed Dec. 24, 1897.)
(No Model.) 2 Sheets—Sheet 2.
Fig. 5.
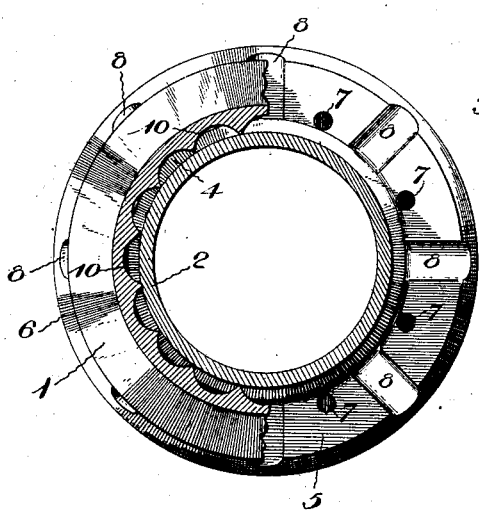
Fig. 6.
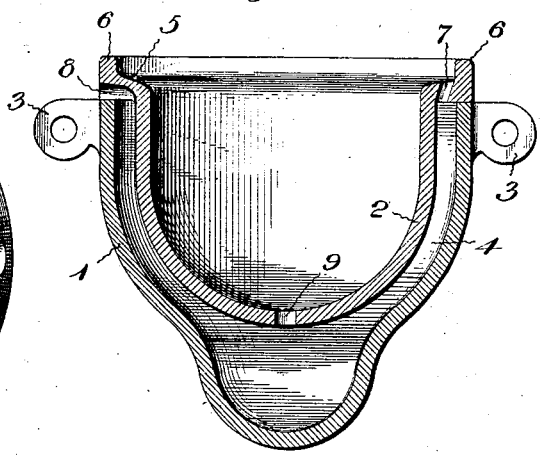
Fig. 7.
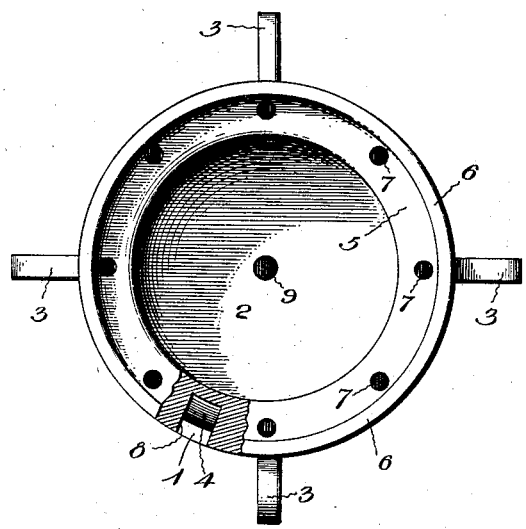
Fig. 8.
Witnesses
J. Graut Culverwell,
V. B. Hillyard.
Inventor
Gustave A. Freund.
By his Attorneys,
C. A. Snow & Co.
THE NORRIS PETERS CO., PHOTO-LITHO., WASHINGTON, D. C.

UNITED STATES PATENT OFFICE.

GUSTAVE A. FREUND, OF HERMANN, MISSOURI.

FLOWER-POT AND HANGING BASKET.

SPECIFICATION forming part of Letters Patent No. 608,590, dated August 9, 1898.

Application filed December 24, 1897. Serial No. 663,397. (No model.)

*To all whom it may concern:*

Be it known that I, GUSTAVE A. FREUND, a citizen of the United States, residing at Hermann, in the county of Gasconade and State of Missouri, have invented a new and useful Flower-Pot and Hanging Basket, of which the following is a specification.

This invention relates to flower-pots, hanging baskets, jardinières, and ferneries, and has for its object to secure a circulation of air and to prevent the souring and drying of the soil and to obviate injury to delicate plants when located in a hot and dry atmosphere.

A further purpose of the invention is to prevent the overflowing of the pot or basket when watering the plant and the soiling of the floor-covering or surface beneath the plant being watered and to provide for catching the overflow and the surplus water escaping at the drain-hole.

A vital feature of the invention is concentrically-disposed pots, baskets, or like receptacles, the outer pot or receptacle being constructed to hold water and the inner pot or receptacle being of pottery-ware or like porous material and of such relative size as to provide a space between it and the outer pot or vessel for ventilation and having an outer rim at its upper edge to overlap the top edge of the outer pot or vessel and formed with vertical openings and lateral passages, said outer rim having a vertical flange exterior to the openings to prevent the overflow of water.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
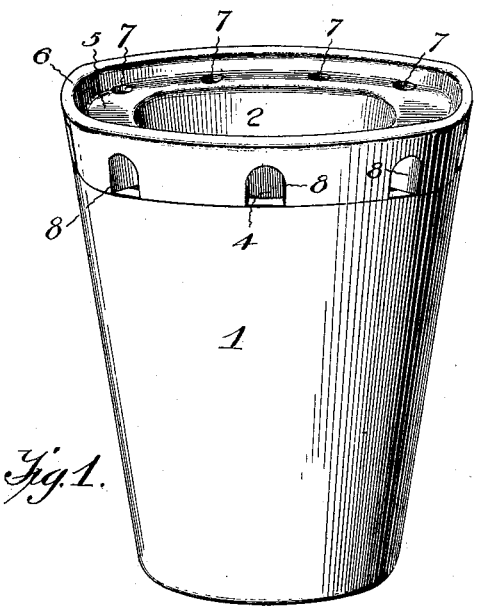
Figure 2:
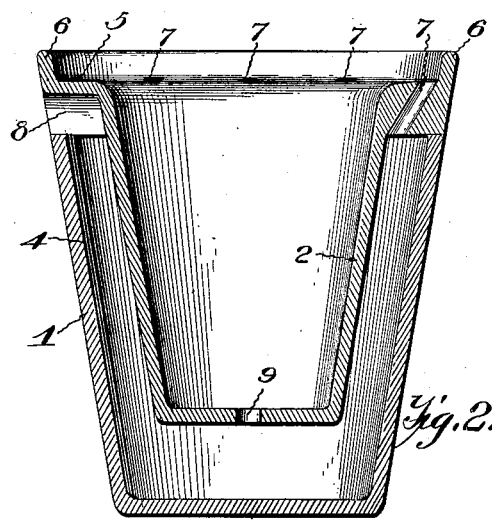
Figure 3:
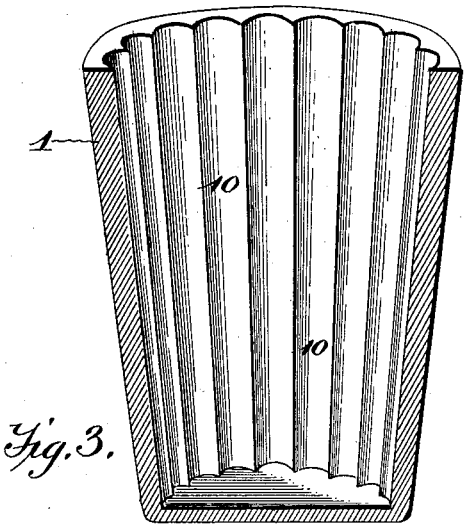
Figure 4:
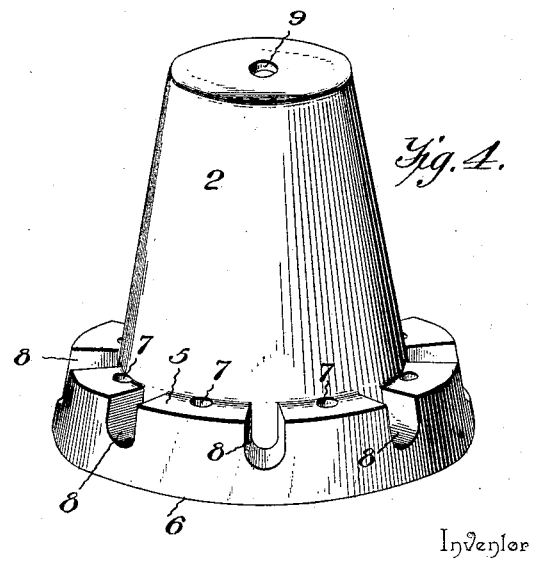

Figure 1 is a perspective view showing the invention applied to a flower-pot. Fig. 2 is a vertical central section thereof. Fig. 3 is a detail perspective view of one-half of an outer pot having its inner side vertically corrugated or ribbed. Fig. 4 is a perspective view of the inner pot. Fig. 5 is a transverse section of a flower-pot of the corrugated variety, parts being broken away. Fig. 6 is a vertical central section showing the invention applied to a hanging basket. Fig. 7 is a top plan view thereof. Fig. 8 is a bottom view of the inner basket.

Corresponding and like parts are referred to in the following description and indicated in the several views of the accompanying drawings by the same reference characters.

The flower-pot, basket, jardinière, or the like may be of any size, pattern, or style of finish, according to the character and grade of the articles. The outer pot, basket, or receptacle is indicated by the reference-numeral 1 and the corresponding inner part by the numeral 2. For a hanging basket the outer receptacle or vessel is provided with a series of ears 3, which are apertured to receive the chains, wires, or other connections by means of which the basket is held in suspension. The outer receptacle may be glazed or constructed of pottery-ware, porcelain, or other material which will hold water and is of larger dimensions than the inner receptacle or vessel 2, so as to leave a space 4 between the two.

The inner receptacle or vessel 2 is of pottery-ware or any porous material which will admit of air finding its way to the roots of the plants and provide for the escape of surplus moisture. This receptacle has an outer flange 5 at its upper edge, which overlaps the top edge of the vessel 1. A vertical rim 6 extends from the outer edge of the flange or rim 5 and constitutes a guard to prevent the overflow of water when watering the plant. A series of openings 7 are provided in the rim or flange 5 and communicate with the space 4 and come wholly within the rim or flange 6. The number and size of these openings 7 will vary according to the style of the completed article. A series of grooves or channels 8 are formed in the under side of the rim or flange 5 and form ventilating-passages for the ingress of air. In the preferable construction the passages 8 and openings 7 are alternately disposed, thereby securing the best results. A drain-hole 9 is formed at the lower end of the receptacle 2 for the escape of surplus water.

In some varieties it is preferred to have the inner surface of the outer vessel or receptacle 1 vertically ribbed or corrugated, as shown at 10, and these ribs or corrugations touch the sides of the inner receptacle and hold it in place and provide, in effect, a multiplicity of passages. This form enables the inner receptacle to be made larger and thinner, because it is braced at different points throughout its circumferential area. The openings 7 and passages 8 will register with the spaces formed by the ribs or corrugations.

When watering a plant placed in a pot, basket, or the like constructed after the manner of the present invention, the surplus water overflowing the soil will pass into the outer pot or receptacle through the openings 7 and space 4, and the excess of water in the soil will escape into the lower portion of the receptacle 1 through the drain-hole 9, thereby preventing the spilling of the water and the consequent soiling of the floor, stand, or other support. The water contained in the lower portion of the vessel 1 will gradually evaporate and keep the air moist and the soil in proper condition for nourishing the plant for a great length of time, so that frequent watering is not necessary, and the moist air escaping through the vent-openings will afford a protection for the plant in an otherwise hot and dry atmosphere.

It is not essential that the outer vessel of the hanging basket be provided with ears, as the suspending means—such as chains, wires, and cords—may be attached to the vessel in any of the usual ways.

Having thus described the invention, what is claimed as new is—

1. In a flower-pot, hanging basket or the like, the combination of inner and outer receptacles having a space between them, and having a rim projecting from one of the receptacles over the said space, and formed with openings and lateral passages, substantially as set forth.

2. In a flower-pot, hanging basket or the like, the combination of an outer receptacle, an inner receptacle having a space between it and the outer receptacle, and having a rim at its upper end extending over the space between the two receptacles and formed with a vertical flange at its outer edge, and a series of openings inside of the vertical flange in communication with the space formed between the two receptacles, substantially as and for the purpose described.

3. In a flower-pot, hanging basket, or the like, the combination of an outer receptacle, an inner receptacle having a space between it and the outer receptacle, and a rim formed with the inner receptacle extending over the space between the two receptacles and resting upon the top edge of the outer receptacle, said rim having a substantially vertical series of openings, and grooves or channels in its lower side forming air-passages, substantially as set forth.

4. A flower-pot or hanging basket comprising an outer receptacle, and an inner receptacle having a drain-opening in its bottom, an outer rim at its upper end, and a vertical flange at the outer edge of the said rim, substantially vertical openings in the rim communicating with the space formed between the two receptacles, and a series of grooves or channels in the lower face of the rim forming air-passages, substantially as and for the purpose described.

5. In a flower-pot, hanging basket or the like, the combination of an outer receptacle having its inner side corrugated or ribbed, an inner receptacle, a rim at the upper edge of the inner receptacle overlapping the top edge of the outer receptacle, a series of openings extending vertically through the rim, and a series of grooves or channels forming passages in the lower side of the said rim, substantially as described.

In testimony that I claim the foregoing as my own I have hereto affixed my signature in the presence of two witnesses.

GUSTAVE A. FREUND.

Witnesses:
ROMANUS KLINGER,
ANTHONY B. WALKER.